(12) United States Patent
Siu et al.

(10) Patent No.: US 11,715,829 B2
(45) Date of Patent: Aug. 1, 2023

(54) ε-VOPO$_4$ CATHODE FOR LITHIUM ION BATTERIES

(71) Applicant: The Research Foundation for The State University of New York, Binghamton, NY (US)

(72) Inventors: Carrie Siu, Philadelphia, PA (US); M. Stanley Whittingham, Vestal, NY (US)

(73) Assignee: The Research Foundation for The State University, Binghamton, NY (US)

(*) Notice: Subject to any disclaimer, the term of this patent is extended or adjusted under 35 U.S.C. 154(b) by 0 days.

(21) Appl. No.: 17/670,470

(22) Filed: Feb. 13, 2022

(65) Prior Publication Data

US 2022/0166021 A1 May 26, 2022

Related U.S. Application Data

(62) Division of application No. 16/291,617, filed on Mar. 4, 2019, now Pat. No. 11,251,430.

(Continued)

(51) Int. Cl.
*H01M 4/58* (2010.01)
*H01M 4/62* (2006.01)
(Continued)

(52) U.S. Cl.
CPC ......... *H01M 4/5825* (2013.01); *C01B 25/372* (2013.01); *H01M 4/136* (2013.01);
(Continued)

(58) Field of Classification Search
CPC .. H01M 4/136; H01M 4/1397; H01M 4/5825; H01M 4/623; H01M 4/625; H01M 2004/021; H01M 2004/028; C01B 25/372
See application file for complete search history.

(56) References Cited

U.S. PATENT DOCUMENTS

| 2007/0166617 A1* | 7/2007 | Gozdz | H01M 4/5825 429/231.95 |
| 2012/0321953 A1* | 12/2012 | Chen | H01M 4/483 977/773 |
| 2013/0260228 A1* | 10/2013 | Sano | H01M 10/0563 429/200 |

FOREIGN PATENT DOCUMENTS

CN 102600875 * 7/2012

OTHER PUBLICATIONS

Kerr, T.A., et al., "Highly Reversible Li Insertion at 4 V in ε-VOPO4/α-LiVOPO4 Cathodes", Electrochemical and Solid State Letters 3, No. 10 (2000), pp. 460-462.*

(Continued)

*Primary Examiner* — Brittany L Raymond
(74) *Attorney, Agent, or Firm* — Hoffberg & Associates; Steven M. Hoffberg

(57) ABSTRACT

The epsilon polymorph of vanadyl phosphate, ε-VOPO$_4$, made from the solvothermally synthesized H$_2$VOPO$_4$, is a high density cathode material for lithium-ion batteries optimized to reversibly intercalate two Li-ions to reach the full theoretical capacity at least 50 cycles with a coulombic efficiency of 98%. This material adopts a stable 3D tunnel structure and can extract two Li-ions per vanadium ion, giving a theoretical capacity of 305 mAh/g, with an upper charge/discharge plateau at around 4.0 V, and one lower at around 2.5 V.

20 Claims, 6 Drawing Sheets

TEM images of ε-VOPO$_4$ hand ground with graphene nanoplatelets for electrode preparation

Related U.S. Application Data

(60) Provisional application No. 62/638,893, filed on Mar. 5, 2018.

(51) Int. Cl.
    *H01M 10/0525*    (2010.01)
    *H01M 4/136*      (2010.01)
    *H01M 4/1397*     (2010.01)
    *C01B 25/37*      (2006.01)
    *H01M 4/02*       (2006.01)

(52) U.S. Cl.
    CPC ......... *H01M 4/1397* (2013.01); *H01M 4/623* (2013.01); *H01M 4/625* (2013.01); *H01M 10/0525* (2013.01); *C01P 2002/72* (2013.01); *C01P 2002/90* (2013.01); *C01P 2004/03* (2013.01); *C01P 2004/04* (2013.01); *H01M 2004/021* (2013.01); *H01M 2004/028* (2013.01)

(56) References Cited

OTHER PUBLICATIONS

English translation of CN Publication 102600875, Jul. 2012.*

* cited by examiner

Morphological and structure characterization of ε-VOPO$_4$. SEM image

XRD pattern with Rietveld refinement of the as synthesized ε-VOPO$_4$.

TEM images of ε-VOPO$_4$ hand ground with graphene nanoplatelets for electrode preparation Galvanostatic charge-discharge curves of ε-VOPO$_4$ from 1.6 to 4.5V cycle performance at C/50, 1C=2 Li CV curve profile of ε-VOPO$_4$ at a scan rate of 0.02mV/s

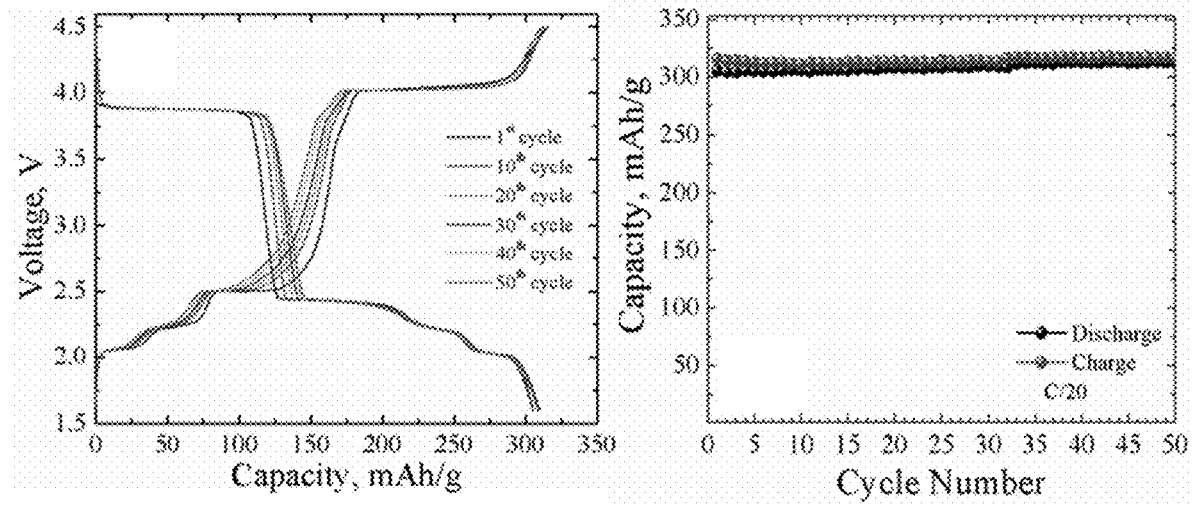
Figure 5A
Galvanostatic charge-discharge curves of ε-VOPO$_4$ from 1.6 to 4.5V
Figure 5B
Cycle performance at C/20, 1C=2Li
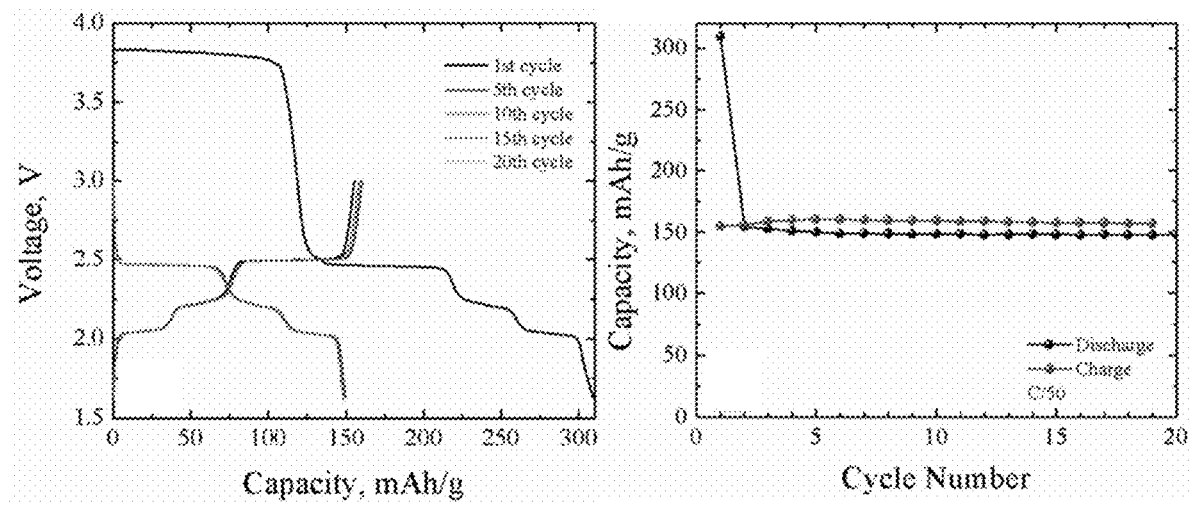
Figure 6A
Galvanostatic charge-discharge curves of ε-VOPO$_4$ at the low voltage region, from 1.6 to 3.0 V
Figure 6B
Cycle performance at C/50, 1C=2Li Cycling curves of ε-VOPO$_4$ in the low voltage region, from 1.6 - 3.0 V, at different rate Cycle performance Galvanostatic charge-discharge curves of ε-VOPO$_4$ at the high voltage region, from 3.0 to 4.5V Cycle performance at C/50, 1C=2Li

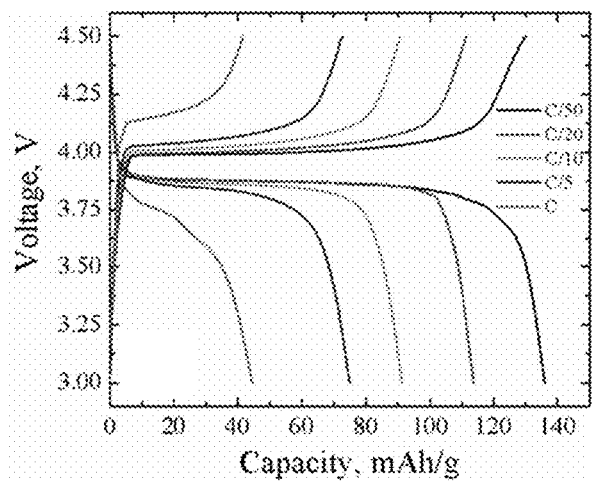 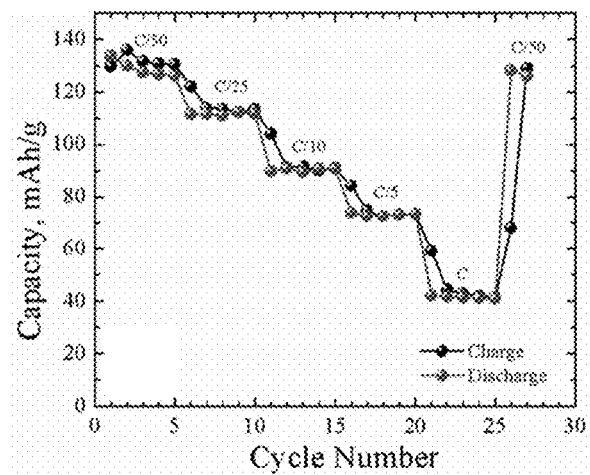
Figure 9A
Cycle curves of ε-VOPO₄ at high voltage region, from 3.0 to 4.5 V, at different current rates
Figure 9B
Cycle performance

ε-VOPO₄ CATHODE FOR LITHIUM ION BATTERIES

CROSS REFERENCE TO RELATED APPLICATIONS

The present invention is a Division of U.S. patent application Ser. No. 16/291,617, filed Mar. 4, 2019, now U.S. Pat. No. 11,251,430, issued Feb. 15, 2022, which is a Non-Provisional of and claims benefit of priority from, U.S. Patent Application No. 62/638,893, filed Mar. 5, 2018, the entirety of which is expressly incorporated herein by reference.

STATEMENT OF FEDERALLY FUNDED RESEARCH

This invention was made with government support under contract DE-SC0012583 awarded by the Department of Energy. The government has certain rights in the invention.

FIELD OF THE INVENTION

The present invention relates to the field of electrode materials for batteries, and more particularly to an ε-vanadyl phosphate cathode having near theoretical dual lithium ion capacity.

BACKGROUND OF THE INVENTION

Energy conversion and storage have become more and more important in transportation, commercial, industrial, residential, and consumer applications. In particular, large-scale implementation of renewable energy, increasing ubiquity of portable electronics, and the next generation of electric vehicles require inexpensive and efficient energy storage systems.

A lithium secondary battery includes a cathode, an anode, and a separator. The separator may be a solid electrolyte, or an additional element with a liquid electrolyte. During discharging of the lithium secondary battery, oxidation reaction occurs in the anode due to deintercalation of lithium ions, while reduction reaction occurs in the cathode due to intercalation of lithium ions. The vice versa processes take place during the battery charging. The electrolyte has selective conductivity only ions, and thus transfers lithium ions between the cathode and the anode. Lithium ions intercalated into an electrode of a battery lead to charge neutrality with electrons entered into the electrode, and thus serve as media storing electric energy in the electrode. Accordingly, the quantity of electric energy storable by the battery is dependent upon the quantity of lithium ions intercalated into the electrode. Although basic performance of the lithium secondary battery, such as operating voltage and energy density, is dependent upon the materials of the cathode and anode, the electrolyte also needs to have high-ion conductivity, electrochemical stability and thermal stability to ensure high performance of the lithium secondary battery.

A typical lithium ion battery electrolyte consists of a lithium salt and a solvent. Because of the high operating voltage, the solvent is typically anhydrous, with organic solvents now common, e.g., glyme. Phosphazenes and phosphoranimines have been proposed as an alternate non-flammable electrolyte. Other nitrogen, sulfur, phosphorus, silicon, compounds are also known as electrolyte additives or electrolytes. The electrolyte needs to be electrochemically stable in a voltage range where reduction and oxidation proceed in the anode and cathode, respectively.

As the use of lithium secondary batteries is expanding to electric vehicles and power storage fields, electrode active materials for use at high voltages emerged and became available. Use of a relatively low-potential anode active material and a relatively high-potential cathode active material has led to a narrower potential window of the electrolyte, so that the electrolyte is more likely to decompose on a surface of the cathode/anode. Lithium secondary batteries for electric vehicles and power storage are likely to be exposed to external high-temperature environment conditions, and the temperatures of these lithium secondary batteries may rise during instantaneous charging and discharging. Accordingly, lifetime and stored energy quantity of the lithium secondary battery may be reduced in such high-temperature environment conditions.

Typical lithium secondary battery technologies are discussed in U.S. Pat. No. 9,819,054, expressly incorporated herein by reference it its entirety.

The non-aqueous solvent, which is in the electrolyte of a lithium secondary battery according to the above-described embodiments, may serve as a migration medium of ions involved in electrochemical reactions of the battery. Any suitable non-aqueous solvent that is commonly used in the art may be used. For example, the non-aqueous solvent may be an organic carbonate compound, an ester compound, an ether compound, a ketone compound, an alcohol compound, an aprotic bipolar solvent, or a combination thereof. The carbonate compound may be an open chain carbonate compound, a cyclic carbonate compound, a fluoro carbonate derivative thereof, or a combination thereof.

The electrolyte useful for the battery is one which does not chemically react with the anode or with the cathode during storage, and permits the migration of ions to intercalate the cathode-active material and vice-versa (during the discharge and charging cycles, respectively). The electrolyte may be present in a pure state (in the form of a solid, fused solid or liquid) or it may be conveniently dissolved in a suitable solvent. As a general rule, the electrolyte material should consist of a compound of the same species as that which is selected for the anode-active material. Thus, useful electrolytes may be conveniently represented by the general formula LY wherein L is a cationic moiety selected from the same materials useful as the anode-active material and Y is an anionic moiety or moieties such as halides, sulfates, nitrates, beta-aluminas, phosphofluorides, perchlorates and rubidium halide. The electrolyte may be present in a pure state in the form of a solid, fused solid (i.e. molten salt) or liquid or it may be conveniently dissolved in a suitable solvent which does not generally hydrolyze or degrade under conditions within the battery. Such electrolytes include ketones, esters, ethers, organic carbonates (such as propylene carbonate), organic lactones, organic nitriles, nitrohydrocarbons, organic sulfoxides, etc. and mixtures thereof. Where the solvent is utilized, the electrolyte salt may be present in a concentration determined by the desired solution conductivity, solubility and chemical reactivity. The electrolyte may include additives to reduce flammability, such as phosphazenes, e.g., cyclic phosphazenes.

Non-limiting examples of the chain carbonate compound are diethyl carbonate ("DEC"), dimethyl carbonate, ("DMC"), dipropyl carbonate ("DPC"), methylpropyl carbonate ("MPC"), ethylpropylcarbonate ("EPC"), methylethyl carbonate ("MEC"), and a combination thereof. Non-limiting examples of the cyclic carbonate compound are ethylene carbonate ("EC"), propylenecarbonate ("PC"), butylene carbonate ("BC"), fluoroethylene carbonate ("FEC"), vinylethylene carbonate ("VEC"), and a combination thereof. Non-limiting examples of the fluorocarbonate compound are fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, and a combination thereof. The carbonate compound may include a combination of cyclic carbonate and chain carbonate, in consideration of dielectric constant and viscosity of the electrolyte. For example, an amount of a cyclic carbonate compound may be at least 10% by volume based on a total volume of the non-aqueous organic solvent. The carbonate compound may be a mixture of such chain carbonate and/or cyclic carbonate compounds as described above with a fluorocarbonate compound. The fluorocarbonate compound may increase solubility of a lithium salt to improve ionic conductivity of the electrolyte, and may facilitate formation of the thin film on the anode. In some embodiments, the fluorocarbonate compound may be fluoroethylene carbonate ("FEC"). An amount of the fluorocarbonate compound may be from about 1 to about 30 percent by volume ("volume %") based on a total volume of the non-aqueous organic solvent. When the amount of the fluorocarbonate compound is within this range, the electrolyte may have an appropriate viscosity to provide desired effects thereof.

Non-limiting examples of the ester compound are methyl acetate, ethyl acetate, n-propyl acetate, dimethyl acetate, methyl propionate ("MP"), ethyl propionate, γ-butyrolactone, decanolide, valerolactone, mevalonolactone, caprolactone, and methyl formate. Non-limiting examples of the ether compound are dibutyl ether, tetraglyme, diglyme, 1,2-dimethoxyethane, 1,2-diethoxyethane, ethoxymethoxyethane, 2-methyltetrahydrofuran, and tetrahydrofuran. An example of the ketone compound is cyclohexanone. Non-limiting examples of the alcohol compound are ethyl alcohol and isopropyl alcohol.

Examples of the aprotic solvent are nitriles (such as R—CN, wherein R is a $C_2$-$C_{20}$ linear, branched, or cyclic hydrocarbon-based moiety that may include a double-bond, an aromatic ring or an ether bond), amides (such as formamide and dimethylformamide), dioxolanes (such as 1,2-dioxolane and 1,3-dioxolane), methylsulfoxide, sulfolanes (such as sulfolane and methylsulfolane), 1,3-dimethyl-2-imidazolidinone, N-methyl-2-pyrrolidinone, nitromethane, trimethyl phosphate, triethyl phosphate, trioctyl phosphate, and triester phosphate.

The non-aqueous organic solvent may be used alone or in a combination of at least two solvents. In the latter case, a mixing ratio of the at least two non-aqueous organic solvents may be appropriately adjusted depending on a desired performance of the battery.

The non-aqueous organic solvent may further include an aromatic hydrocarbon organic solvent in the carbonate solvent. The carbonate solvent and the aromatic hydrocarbon organic solvent may be mixed, for example, in a volume ratio of about 1:1 to about 30:1. Examples of the aromatic hydrocarbon organic solvent are benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, 3,5-difluorotoluene, 2,3,4-trifluorotoluene, 2,3,5-trifluorotoluene, 2,3,6-trifluorotoluene, 3,4,5-trifluorotoluene, 2,4,5-trifluorotoluene, 2,4,6-trifluorotoluene, 2-chlorotoluene, 3-chlorotoluene, 4-chlorotoluene, 2,3-dichlorotoluene, 2,4-dichlorotoluene, 2,5-dichlorotoluene, 2,6-dichlorotoluene, 2,3,4-trichlorotoluene, 2,3,5-trichlorotoluene, 2,3,6-trichlorotoluene, 3,4,5-trichlorotoluene, 2,4,5-trichlorotoluene, 2,4,6-trichlorotoluene, 2-iodotoluene, 3-iodotoluene, 4-iodotoluene, 2,3-diiodotoluene, 2,4-diiodotoluene, 2,5-diiodotoluene, 2,6-diiodotoluene, 3,4-diiodotoluene, 3,5-diiodotoluene, 2,3,4-triiodotoluene, 2,3,5-triiodotoluene, 2,3,6-triiodotoluene, 3,4,5-triiodotoluene, 2,4,5-triiodotoluene, 2,4,6-triiodotoluene, o-xylene, m-xylene, p-xylene, and combinations thereof.

Suitable electrolyte salts include, for example, $LiPF_6$, $LiBF_4$, $LiClO_4$, LiTFSI. Suitable solvents may be any solvent which is stable within the electrochemical window of the cell and is inert to other components of the cell. Examples of suitable solvents include carbonate solvents such as ethylene carbonate, diethyl carbonate, and propylene carbonate, organic ethers such as dioxolane, dimethyl ether and tetrahydrofuran and organic nitriles such as acetonitrile. Additionally, the electrolyte may be a nonaqueous polymer electrolyte such as a gel polymer electrolyte, a solid ceramic electrolyte. In one embodiment, the electrolyte may include additives such as fluoroethylene carbonate (FEC) in order to, for example, improve cycling.

The lithium salt may be any suitable lithium salt that is commonly used for lithium batteries. Examples of the lithium salt for the non-aqueous electrolyte are $LiPF_6$, $LiBF_4$, $LiSbF_6$, $LiAsF_6$, $LiSbF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiAlF_4$, $LiBPh_4$, $LiBioCl_{10}$, $CH_3SO_3Li$, $C_4F_3SO_3Li$, $(CF_3SO_2)_2NLi$, $LiN(C_xF_{2x+1}SO_2)(C_yF_{2y+1}SO_2)$ (wherein x and y are natural numbers), $CF_3CO_2Li$, LiCl, LiBr, LiI, LIBOB (lithium bisoxalato borate), lower aliphatic carboxylic acid lithium, lithium terphenylborate, lithium imide, and a combination thereof. These lithium salts may be used as a supporting electrolytic salt.

A concentration of the lithium salt may be within a range known to one of ordinary skill in the art. The concentration of the lithium salt is not specifically limited, and in some embodiments, may be in a range of about 0.1 molar ("M") to about 2.0 M in the electrolyte to improve practical performance of a lithium battery. When the concentration of the lithium salt is within this range, the electrolyte may have appropriate conductivity and appropriate viscosity for improved performance, and may improve mobility of lithium ions.

In some embodiments, the electrolyte for a lithium battery may further include an additive to facilitate the formation of a stable solid electrolyte interphase ("SEI") or a thin film on a surface of an electrode to provide improved cycle characteristics.

Non-limiting examples of the additive are tris(trimethylsilyl)phosphate ("TMSPa"), lithium difluoro oxalate borate ("LiFOB"), vinylene carbonate ("VC"), propane sulfone ("PS"), succinonitrile ("SN"), LiBF.sub.4, a silane compound having a functional group able to form a siloxane bond (for example, acryl, amino, epoxy, methoxy, ethoxy, or vinyl), and a silazane compound such as hexamethyldisilazane. These additives may be used alone or in a combination of at least two thereof.

An amount of the additive may be from about 0.01 wt % to about 10 wt % based on a total weight of the non-aqueous organic solvent. For example, the amount of the additive may be from 0.05 wt % to about 10 wt %, in some embodiments, from about 0.1 wt % to about 5 wt %, and in some other embodiments, from about 0.5 wt % to about 4 wt %, based on the total weight of the non-aqueous organic solvent. However, the amount of the additive is not particularly limited unless the additive significantly hinders improvement in capacity retention rate of a lithium battery including the electrolyte. The lithium battery may be manufactured using a method known in the art.

According to the above-embodiments of the present disclosure, the lithium secondary battery may have a thin film formed on the surface of the cathode due to oxidation of at least a part of the additive in the electrolyte during initial charging of the lithium secondary battery. Thus, the lithium secondary battery may have improved capacity retention characteristics, lifetime characteristics and high-rate characteristics even when charged at a high operating voltage of about 4.0 V to about 5.5 V, for example, a voltage about 4.3 V to about 5.5 V. An additive in the electrolyte may enhance formation of a thin film on a surface of the cathode, the thin film having a thickness of, for example, about 0.05 nanometers ("nm") to about 100 nm. For example, the thin film may have a thickness of about 0.1 nm to about 80 nm, and in some embodiments, about 0.5 nm to about 50 nm. The thin film on the cathode surface may effectively prevent oxidation of the electrolyte on the cathode surface so that the conduction of lithium ions is not impeded.

FIG. 10 is an exploded perspective view of a lithium secondary battery 100 according to an embodiment. Although the lithium secondary battery 100 illustrated in FIG. 10 is cylindrical, embodiments of the present disclosure are not limited thereto, and lithium secondary batteries according to embodiments may be of a rectangular type or a pouch type. Lithium secondary batteries may be classified as lithium ion batteries, lithium ion polymer batteries, or lithium polymer batteries, according to the type of separator and/or electrolyte included therein. In addition, lithium batteries may be classified as cylindrical type, rectangular type, coin type, or pouch type, according to the shape thereof. Lithium batteries may also be classified as either bulk type or thin film type, according to the size thereof. Lithium secondary batteries according to embodiments may have any appropriate shape. The structure of a lithium secondary battery and a method of manufacturing the same are known in the art, so a detailed description thereof will not be recited here. Referring to FIG. 10, the lithium secondary battery 100, which is cylindrical, includes an anode 112, a cathode 114, a separator 113 disposed between the anode 112 and the cathode 114, and an electrolyte (not shown) impregnated into the anode 112, the cathode 114 and the separator 113, a battery case 120, and a sealing member 140 sealing the battery case 120. The lithium secondary battery 100 is manufactured by sequentially stacking the anode 112, the cathode 114, and the separator 113 upon one another to form a stack, rolling the stack in a spiral form, and accommodating the rolled up stack in the battery case 120. The cathode 114 includes a cathode current collector, and a cathode active material layer disposed on the cathode current collector. The cathode current collector may have a thickness of about 3 μm to about 500 μm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics.

Known cathode active material layers include a cathode active material, a binder, and a conducting agent.

Known cathode active materials include lithium-containing metal oxides, e.g., at least one of a composite oxide of lithium with a metal selected from Co, Mn, Ni, and a combination thereof.

During initial cycling, a solid electrolyte interphase layer (SEI layer) forms in an electrolyte battery, representing insoluble breakdown products of the electrolyte in combination with other battery components, such as electrode material. The SEI layer serves to protect the electrolyte from further free radical reactions during overvoltage periods, e.g., during charging.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or any other method known to one of ordinary skill in the art.

The binder strongly binds positive cathode active material particles together and to a current collector. Examples of the binder are, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

Known electrodes include a conducting agent used to provide conductivity to electrodes. Any electron conducting material that does not induce chemical change in batteries may be used. Examples of the conducting agent include natural graphite, artificial graphite, carbon black, acetylene black, ketjen black, carbon fibers, and metallic materials, including copper, nickel, aluminum, and silver, in powder or fiber form. The conducting agent may include a single conductive material, such as a polyphenylene derivative, or a combination of at least two conductive materials.

The amounts of the cathode active material, the binder, and the conducting agent may be equivalent to those commonly used in lithium batteries. For example, a weight ratio of the cathode active material to a mixture of the conducting agent and the binder may be from about 98:2 to about 92:8, and in some embodiments from about 95:5 to about 90:10. A mixing ratio of the conducting agent to the binder may be, but not limited, from about 1:1.5 to about 1:3. The known cathode active materials may have, for example, an operating voltage range of about 4.0 V to ≥5.5 V.

An exemplary lithium secondary battery 100, shown in FIG. 10, is cylindrical, and includes an anode 112, a cathode 114, a separator 113 disposed between the anode 112 and the cathode 114, and an electrolyte (not shown) impregnated into the anode 112, the cathode 114 and the separator 113, a battery case 120, and a sealing member 140 sealing the battery case 120. The lithium secondary battery 100 is manufactured by sequentially stacking the anode 112, the cathode 114, and the separator 113 upon one another to form a stack, rolling the stack in a spiral form, and accommodating the rolled up stack in the battery case 120.

The cathode 114 includes a cathode current collector, and a cathode active material layer disposed on the cathode current collector. The cathode current collector may have a thickness of about 3 μm to about 500 μm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics. The cathode active material layer includes a cathode active material, a binder, and a conducting agent.

The anode active layer includes an anode active material, a binder, and optionally a conducting agent. The anode active material is not particularly limited, and may be selected from any anode active materials used in the art. Non-limiting examples of the anode active material are lithium metal, a lithium metal alloy, a transition metal oxide, a doped or undoped lithium material, and a material that allows reversible intercalation and deintercalation of lithium ions, which may be used as a mixture or in combination of at least two thereof. The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn). Non-limiting examples of the transition metal oxide are tungsten oxide, molybdenum oxide, titanium oxide, lithium titanium oxide, vanadium oxide, and lithium vanadium oxide. Examples of the material that allows doping or undoping of lithium therein are Si, Sn, Al, Ge, Pb, Bi, Sb, and a Si—Y alloy (where Y is an alkali metal, a alkali earth metal, a Group 11 element, a Group 12 element, a Group 13 element, a Group 14 element, a Group 15 element, a Group 16 element, a transition metal, a rare earth element, and a combination thereof, except for Sn. For example, Y may be magnesium (Mg), calcium (Ca), strontium (Sr), barium (Ba), radium (Ra), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), seaborgium (Sg), technetium (Tc), rhenium (Re), iron (Fe), lead (Pb), ruthenium (Ru), osmium (Os), rhodium (Rh), iridium (Jr), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or combinations thereof.

The material that allows reversible intercalation and deintercalation of lithium ions may be any carbonaceous anode active material that is commonly used in a lithium battery. Examples of such carbonaceous materials are crystalline carbon, amorphous carbon, or mixtures thereof. Non-limiting examples of the crystalline carbon are natural graphite, artificial graphite, expanded graphite, graphene, fullerene soot, carbon nanotubes, and carbon fiber. Non-limiting examples of the amorphous carbon are soft carbon (carbon sintered at low temperatures), hard carbon, mesophase pitch carbides, and sintered corks. The carbonaceous anode active material may be in, for example, spherical, planar, fibrous, tubular, or powder form.

The binder strongly binds anode active material particles together and to the anode current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The conducting agent is used to provide conductivity to the anode. Any electron conducting material that does not induce chemical change in batteries may be used. Examples of the conducting agent are carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The amounts of the anode active material, the binder, and the conducting agent may be equivalent to those commonly used in lithium batteries. For example, a weight ratio of the anode active material to a mixture of the conducting agent and the binder may be from about 98:2 to about 92:8. A mixing ratio of the conducting agent to the binder may be, but not limited to, from about 1:1.5 to about 1:3. The anode 112 and the cathode 114 may be each manufactured by mixing an active material, a conducting agent, and a binder in a solvent to prepare an active material composition, and coating the active material composition on a current collector. Any method of manufacturing such electrodes which is known to one of ordinary skill in the art may be used. Thus, a detailed description thereof will not be provided herein. Non-limiting examples of the solvent are N-methylpyrrolidone ("NMP"), acetone, and water.

A separator may be disposed between the cathode and the anode, according to the type of the lithium secondary battery. The separator helps maintain electrical isolation between the cathode and the anode. The separator may be any separator that is commonly used for lithium batteries. In particular, the separator may have low resistance to migration of ions in an electrolyte and have high electrolyte-retaining ability. Examples of the separator are glass fiber, polyester, Teflon, polyethylene, polypropylene, polyvinylidene fluoride ("PVDF"), polytetrafluoroethylene ("PTFE"), and a combination thereof, each of which may be a nonwoven fabric or a woven fabric. The separator may be a single layer or a multi-layer. Examples of the separator are a polyethylene/polypropylene double-layer separator, polyethylene/polypropylene/polyethylene triple-layer separator, and a polypropylene/polyethylene/polypropylene triple-layer separator. The separator may have a pore diameter of about 0.01 to about 10 μm and a thickness of about 3 to about 100 μm. The electrolyte may be injected between the cathode 114 and the anode 112 with the separator 113 therebetween.

A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

See: U.S. Pat. Nos. 8,318,353; 7,901,810; 7,790,319; 7,771,628; 7,759,008; 7,041,239; 6,872,492; 4,355,162; 4,376,709; 4,376,709; 4,459,406; 5,849,434; 6,844,047; 6,872,492; 6,872,492; 6,888,663; 6,958,860; 7,041,239; 7,338,734; 7,383,083; 7,759,008; 7,759,008; 7,771,628; 7,790,319; 7,901,810; 7,939,201; 7,955,733; 7,960,058; 7,964,308; 7,972,728; 7,988,746; 7,998,617; 8,003,250; 8,057,936; 8,067,117; 8,088,512; 8,148,009; 8,148,013; 8,158,090; 8,168,326; 8,206,468; 8,206,469; 8,218,351; 8,241,789; 8,277,975; 8,282,691; 8,318,353; 8,323,831; 8,323,832; 8,361,661; 8,420,258; 8,435,678; 8,445,135; 8,449,980; 8,481,208; 8,492,031; 8,580,430; 8,586,238; 8,617,430; 8,617,745; 8,652,683; 8,658,310; 8,709,647; 8,722,227; 8,722,227; 8,722,242; 8,734,539; 8,785,043; 8,821,763; 8,852,807; 8,932,762; 8,936,871; 8,951,676; 8,951,680; 8,993,171; 8,999,571; 9,065,093; 9,077,032; 9,293,790; 9,299,966; 9,305,716; 9,349,544; 9,362,562; 20020192553; 20020192553; 20020192553; 20040005265; 20040016632; 20040016632; 20040048157; 20040066556; 20040197654; 20040197654; 20040262571; 20040262571; 20050238961; 20050238961; 20050238961; 20060110580; 20060194112; 20060194112; 20060292444; 20070031732; 20070072034; 20070072034; 20070141468; 20070141468; 20070166617; 20070190418; 20070248520; 20070292747; 20070298317; 20080261113; 20080261113; 20090214944; 20090220838; 20090220838; 20090246636; 20090311597; 20100075225; 20100078591; 20100233545; 20100266899; 20100266899; 20100303701; 20110052473; 20110052986; 20110052986; 20110052986; 20110052995; 20110159381; 20110195306; 20110200848; 20110200848; 20110229765; 20110229765; 20110274948; 20120140378; 20120164499; 20120164499; 20120214071; 20120219856; 20120219859; 20120237828; 20120270109; 20120315538; 20130034780; 20130052492; 20130059211; 20130078523; 20130078524; 20130084474; 20130084474; 20130084474; 20130115521; 20130252112; 20130252114; 20130302697; 20130344367; 20130344367; 20140099557; 20140220450; 20140242445; 20140302403; 20140370388; 20150111105; 20150132650; 20150236342; 20150236349; 20150263382; 20150303474; 20150303474; 20150311565; 20150364753; 20160028114; 20160096334; 20160111720; and 20160164152, each of which is expressly incorporated herein by reference in its entirety.

See Also:

Berrah, Fadila, et al. "The vanadium monophosphates AVOPO$_4$: Synthesis of a second form β-KVOPO$_4$ and structural relationships in the series." *Solid state sciences* 3.4 (2001): 477-482.

Zima, Vítřslav, et al. "Ion-exchange properties of alkali-metal redox-intercalated vanadyl phosphate." *Journal of Solid State Chemistry* 163.1 (2002): 281-285.

Lii, Kwang-Hwa, and Wei-Chuan Liu. "RbVOPO$_4$ and CsVOPO$_4$, Two Vanadyl (IV) Orthophosphates with an Intersecting Tunnel Structure and Discrete VO$_5$ Pyramids." *Journal of Solid State Chemistry* 103.1 (1993): 38-44.

Yakubovich, O. V., O. V. Karimova, and O. K. Mel'nikov. "The mixed anionic framework in the structure of Na$_2${MnF [PO$_4$]}." *Acta Crystallographica Section C: Crystal Structure Communications* 53.4 (1997): 395-397.

Schindler, M., F. C. Hawthorne, and W. H. Baur. "Crystal chemical aspects of vanadium: polyhedral geometries, characteristic bond valences, and polymerization of (VO n) polyhedra." *Chemistry of Materials* 12.5 (2000): 1248-1259.

Panin, Rodion V., et al. "Crystal Structure, Polymorphism, and Properties of the New Vanadyl Phosphate Na$_4$VO (PO$_4$)$_2$." *Chemistry of materials* 16.6 (2004): 1048-1055.

Belkhiri, Sabrina, Djillali Mezaoui, and Thierry Roisnel. "The Structure Determination of a New Mixed Mono-Arsenate K$_2$V$_2$O$_2$ (AsO$_4$)$_2$." 3 éme *Conférence Internationale sur le Soudage, le* CND et l'Industrie des Matériaux et Alliages (IC-WNDT-MI'12). Centre de Recherche Scientifique et Technique en Soudage et Contrôle (CSC), 2012.

Glasser, Leslie, and C. Richard A. Catlow. "Modelling phase changes in the potassium titanyl phosphate system." *Journal of Materials Chemistry* 7.12 (1997): 2537-2542.

Fedotov, Stanislav S., et al. "AVPO$_4$F (A=Li, K): A 4 V Cathode Material for High-Power Rechargeable Batteries." *Chemistry of Materials* 28.2 (2016): 411-415.

Belkhiri, Sabrina, Djillali Mezaoui, and Thierry Roisnel. "K$_2$V$_2$O$_2$ (AsO$_4$)$_2$." *Acta Crystallographica Section E: Structure Reports Online* 68.7 (2012): i54-i54.

Yakubovich, O. V., V. V. Kireev, and O. K. Mel'nikov. "Refinement of crystal structure of a Ge-analogue of natisite Na$_2$ {TiGeO$_4$} and prediction of new phases with anionic {MTO$_5$} radicals." *Crystallography Reports* 45.4 (2000): 578-584.

Boudin, S., et al. "Review on vanadium phosphates with mono and divalent metallic cations: syntheses, structural relationships and classification, properties." *International Journal of Inorganic Materials* 2.6 (2000): 561-579.

SUMMARY OF THE INVENTION

The present technology provides a vanadyl phosphates ε-VOPO$_4$ cathode which has achieved multi-electron storage as lithium ion battery cathode. Vanadyl phosphates in general have low intrinsic conductivity. A high efficiency battery cathode should have low electrical resistance. To overcome the conductivity problem, the cathode material is preferably nanosized, and coated with particles of a low activation energy conductive material, such as graphene or carbon nanotubes. This cathode utilizes the two redox couples of vanadium cation (i.e. $V^{5+}/V^{4+}$, $V^{4+}/V^{3+}$) to permit more than one lithium ion to be stored in the unit structure per vanadium ion. The involvement of the multiple redox processes of vanadium is reflected by the well separated high voltage plateau region at ~3.8 V and low voltage plateau region at ~2 V.

The two-electron redox property of vanadium results in a theoretical capacity of 305 mAh/g. In practical, maximum discharge capacity of over 300 mAh/g was obtained within the voltage region of 1.3-4.5 V vs. Li/Li$^+$, which is over 90% of the theoretical value.

The electrode material is not limited to use in batteries, or as a cathode, or for use in lithium ion electrolyte systems.

In addition to ε-VOPO$_4$ material, the cathode may further contain any cathode material suitable for lithium-ion insertion and release. Suitable auxiliary materials may include phosphate based materials such as FePO$_4$, VPO$_4$F, V$_2$(PO$_4$)$_2$F$_3$, FePO$_4$F, and V$_2$(PO$_4$)$_3$; oxides such as CoO$_2$, orthorhombic MnO$_2$, layered iron oxides FeO$_2$, chromium oxide CrO$_2$, layered Ni$_{0.5}$Mn$_{0.5}$O$_2$, and V$_6$O$_{15}$ nanorods; layer sulfides such as TiS$_2$; perovskite transition metal fluorides, or a mixture thereof.

The epsilon polymorph of vanadyl phosphate, ε-VOPO$_4$, made from the hydrothermally or more generally, solvothermally synthesized H$_2$VOPO$_4$, is a cathode material for lithium-ion batteries that has been optimized to reversibly intercalate two Li-ions to reach the full theoretical capacity at least 50 cycles with a coulombic efficiency of 98%. This material adopts a stable 3D tunnel structure and can extract two Li-ions per vanadium ion, giving a theoretical capacity of 305 mAh/g, with an upper charge/discharge plateau at around 4.0 V, and one lower at around 2.5 V. As ε-VOPO$_4$ is capable of reversibly intercalating more than one lithium ion into the structure, it stores and delivers more energy than current batteries in the market. Compared to LiFePO$_4$, ε-VOPO$_4$ has a higher electronic conductivity and higher energy density with the insertion of one Li-ion, 159 mAh/g at 4.0 V vs 170 mAh/g at 3.45 V. Overall, ε-VOPO$_4$ makes a great candidate for next generation of high energy Li-ion batteries. The nano-sized ε-VOPO$_4$ particles demonstrate enhanced electrochemistry and cyclability for potential applications in lithium-ion batteries.

Phosphate based materials have been considered as excellent cathode candidates because of their high stability and low cost. However, most phosphate cathodes show poor electronic conductivity and as a result, full capacity of the cathode can't be achieved in the traditional charge/discharge processes.

One approach to obtain a cathode of high capacity is to employ a transition metal capable of multiple electron transfer, and thus able to assume more than one lithium. Vanadium is well-known to be capable of transfer of two electrons, such as from the +5 to +3 oxidation state.

Vanadyl phosphate (VOPO$_4$) is a material combining the merits of vanadium and of phosphate and theoretically has the possibility to show high capacity as well as good stability as a cathode active material for a sodium battery. The vanadyl phosphates with formula of AVOPO$_4$ (A=alkali metal) form a class of materials which can serve as a multi-electron cathode. These cathodes can utilize the V$^{3+}$-V$^{4+}$-V$^{5+}$ redox couples, during which two ions can be reversible stored in the structure instead of one. Therefore, this class of cathode materials is expected to exhibit much higher energy density than the traditional one-electron cathodes. By far, the two-electron behavior only has been observed in Li ion system (i.e. two-Li) in some different phases of VOPO$_4$ and LiVOPO$_4$, within a voltage window covering the V$^{3+}$→V$^{5+}$ transition, which exhibits enhanced practical energy densities.

Vanadium phosphate materials have been described as cathode materials.

It is an object of this invention to a high energy density cathode active material for use in a lithium battery, using ε-VOPO$_4$ as an active material, and which comprises a conductivity enhancer comprising graphene or carbon nanotubes.

The cathode containing any of the above-listed materials may be mixed with other electrically conductive materials and binders. Examples of electrically conductive materials include carbon black and vapor ground carbon fibers. Examples of binders include polyvinylidene fluoride (PVDF), sodium alginate, and sodium carboxymethyl cellulose.

The cathode active material may be mixed with binders recognized by one of skill in the art as suitable for lithium-ion batteries. For example, suitable binders may include PVDF, polytetrafluoroethylene (PTFE), styrene butadiene rubber (SBR), and polyimide.

According to the present invention, the conductive additive is graphene or carbon nanotubes. The amount of conductive additive may be 1-10% by weight, and preferably about 5%.

The cathode active material may be present as a sheet, ribbon, particles, or other physical form. An electrode containing the cathode active material may be supported by a current collector. A current collector may include a metal or other electrically conducting material. The current collector may be formed of carbon, carbon paper, carbon cloth or a metal or noble metal mesh or foil.

U.S. Pat. No. 9,722,247 (Zhang et al.) discusses ε-Vanadyl phosphates as high energy density cathode materials for rechargeable sodium batteries.

For example, U.S. Pat. No. 6,872,492 (Barker et al.) describes sodium ion batteries based on cathode materials of the general formula: A$_a$M$_b$(XY$_4$)$_c$Z$_d$. Example 4b describes synthesis of VOPO$_4$xH$_2$O and Examples 4c and 4d describe synthesis of NaVOPO$_4$. Charge and discharge of a cell containing a cathode of the NaVOPO$_4$ and a negative electrode of lithium metal is described. Sodium ion cells prepared are based on a carbon composite negative electrode and NaVOPO$_4$F as the positive electrode active material.

U.S. 2013/0034780 (Muldoon et al.) describes a magnesium battery and lists VOPO$_4$ as a suitable positive electrode active material.

U.S. 2004/0048157 (Neudecker et al.) describes a lithium solid state thin film battery containing a lithiated vanadium oxide film as an anode and as one possible cathode material, LiVOPO$_4$.

U.S. 2013/0260228 (Sano et al.) describes a lithium secondary battery having as a positive electrode material, a compound of the formula: Lia(M)$_b$(PO$_4$)$_c$F$_d$. LiVOPO$_4$ is described in a preferred embodiment.

U.S. 2013/0115521 (Doe et al.) describes a magnesium secondary battery wherein the current collectors are coated with a thin protective coating. VOPO$_4$ is listed as a positive electrode active material.

U.S. 2012/0302697 (Wang et al.) describes a magnesium cell having a carbon or other graphitic material as a cathode active material. VOPO$_4$ is included in a list of other cathode active materials.

Kerr, T. A., J. Gaubicher, and L. F. Nazar. "Highly Reversible Li Insertion at 4 V in ε-VOPO$_4$/α-LiVOPO$_4$ Cathodes." Electrochemical and Solid-State Letters 3, no. 10 (2000): 460-462 discusses a ε-VOPO$_4$/α-LiVOPO$_4$ cathode for a lithium battery having a capacity of 100 mA/g.

Quackenbush, Nicholas F., Linda Wangoh, Bohua Wen, Ruibo Zhang, Youngmin Chung, Natasha Chernova, Zehua Chen et al. "Interfacial Effects of Electrochemical Lithiation of Epsilon-VOPO4 and Evolution of the Electronic Structure." In Meeting Abstracts, no. 6, pp. 491-491. The Electrochemical Society, 2015 discusses the use of ε-VOPO$_4$ as a cathode material in lithium batteries, which achieves dual cation exchange only on particle surfaces, and not in the bulk material.

Seven distinct VOPO$_4$ structures or phases are known. All of the reported structures contain VO$_6$ octahedra sharing vertices with PO$_4$ tetrahedra. The oxygen polyhedron of vanadium is irregular so that it is often considered as a VO$_5$ square pyramid with a very short apical vanadyl bond (V=O) and a much more remote sixth oxygen atom (V . . . O). These seven phases can be distinguished as:

$\alpha_I$: has a lamellar structure with alternating antiparallel V=O bonds pointing inside the layers.

$\alpha_{II}$: also has a lamellar structure with antiparallel V=O bonds pointing outside the layers.

γ: is an intermediate form between $\alpha_I$ and $\alpha_{II}$ with half parallel V=O bonds pointing inside, half outside the layers.

δ: has antiparallel V=O bonds pointing half inside, half outside the layers. The vanadyl chains point to different directions in the unit cell.

ω: shows disordered vanadyl chains in the [1 0 0] and [0 1 0] directions of the tetragonal cell.

β: All vanadyl chains are parallel and tilted to form zigzag O=V . . . O=V chains.

ε: The structure is a distorted form of β-phase and differs in terms of tilted O=V . . . O angle.

It is therefore an object to provide an intercalation-type electrode composition for a lithium ion battery cathode, having a capacity of at least 275 mAh/g, and may have a capacity of at least 280 mAh/g, at least 290 mAh/g, at least 300 mAh/g, or at least 305 mAh/g, for example. The intercalation electrode composition may comprise a transition metal having a two-electron redox property, having a discharge capacity of at least 75% of theoretical value, at least 80% of theoretical value, at least 85% of theoretical value, or at least 90% of theoretical value.

The lithium ion battery cathode may comprise a transition metal, which undergoes a change in oxidation state of at least two between a charged and discharged state.

The intercalation electrode composition preferably comprises VOPO$_4$, most preferably in the epsilon form, i.e., ε-VOPO$_4$. The intercalation electrode composition preferably has a conductivity enhancer comprising graphene or carbon nanotubes. The intercalation electrode composition may comprise ε-VOPO$_4$ and at least 2.5% by weight graphene, at least 3.0% by weight graphene, at least 3.5% by weight graphene, at least 4.0% by weight graphene, at least 5% by weight graphene, at least 6% by weight graphene, at least 7% by weight graphene, at least 8% by weight graphene, at least 9% by weight graphene, or at least 10% by weight graphene.

The intercalation electrode composition may comprise, for example, at least 75% by weight ε-VOPO$_4$, at least 5% by weight graphene nanoplatelets, and at least 5% by weight of a poly vinylidene fluoride (PVDF) binder. The intercalation electrode composition may comprise 85% by weight ε-VOPO$_4$, at least 5% by weight graphene nanoplatelets, and 10% by weight binder. The intercalation electrode composition may comprise 75% by weight ε-VOPO$_4$, 15% by weight graphene nano platelets, and 10% by weight of a poly vinylidene fluoride (PVDF) binder.

The intercalation electrode composition may be provided as a cathode in a battery comprising a lithium ion anode, an electrolyte adapted to operate at a battery potential of at least 4.5V, a separator, and a supporting lithium salt.

The intercalation electrode composition may have a first state in which at least 80 mol % of a transition metal element is oxidized in a first oxidation state, and a second state in which at least 80 mol % of a transition metal element is oxidized in a second oxidation state, the first state and the second state differing by two, and the at least 80 mol % of the transition metal element in the first state is associated with two lithium ions per transition metal element ion.

Another object provides a lithium ion battery cathode composition, comprising ε-VOPO$_4$, electrically conductive graphene in a ratio of at least 3% by weight of the ε-VOPO$_4$, and a binder, on a current collector substrate.

A further object provides an intercalation electrode composition for a lithium ion cathode, having a dual lithium ion exchange characteristic, having a capacity of about 125 mAh/g at a voltage exceeding 3.7 V, and a capacity of about 260 mAh/g at a voltage exceeding 2.0 V.

A still further object provides an intercalation electrode composition for a lithium ion cathode, having a dual lithium ion exchange characteristic, having an energy capacity of at least 850 mWh/g. The energy capacity may be at least 860 mWh/g, at least 870 mWh/g, an energy capacity of at least 880 mWh/g, an energy capacity of at least 890 mWh/g, or an energy capacity of at least 900 mWh/g.

Another object provides an electrode composition for a lithium ion cathode, comprising ε-VOPO$_4$ having a theoretical capacity of 305 mA/g and an observed capacity of at least 275 mAh/g. The observed capacity may be at least 280 mAh/g, at least 285 mAh/g, at least 290 mAh/g, at least 295 mAh/g, or at least 300 mAh/g.

A further object provides an electrode, comprising a ε-VOPO$_4$ lithium ion exchange active material, graphene nanoplatelets, and a binder, having an energy density of 900 mWh/g.

A still further object provides an electrode, comprising a ε-VOPO$_4$ lithium ion exchange active material, having a current-voltage profile which displays peaks at about 2.1 V, 2.25 V, 2.5 V, and 3.9 V. representing a dual-lithium ion exchange per vanadium ion of at least 90%.

An object also provides a method of making a lithium ion battery cathode, comprising: hydrothermally or solvothermally generating ε-VOPO$_4$; mixing the ε-VOPO$_4$, with graphene nanoplatelets and a binder for form a mixture; and coating a current collector with a slurry of the mixture. The graphene nanoplatelets may a surface area of 750 m$^2$/g, for example. The binder may be polyvinylidene fluoride. The weight ratio of ε-VOPO$_4$, graphene nanoplatelets, and polyvinylidene fluoride may be 75:15:10.

The invention comprises the cathode material, an electrode formed of the cathode material, and electrochemical devices, e.g., a secondary battery, formed using the electrode.

Other object will be apparent from a review hereof.

BRIEF DESCRIPTION OF THE DRAWINGS

These and/or other aspects will become apparent and more readily appreciated from the following description of the embodiments, taken in conjunction with the accompanying drawings in which:

FIG. 5A shows galvanostatic charge-discharge curves of ε-VOPO$_4$ from 1.6 to 4.5 V at C/20.

FIG. 5B shows cycle performance of ε-VOPO$_4$ from 1.6 to 4.5 V at C/20, 1C=2Li.

FIG. 6A shows galvanostatic charge-discharge curves of ε-VOPO$_4$ at the low voltage region, from 1.6 to 3.0 V.

FIG. 6B shows cycle performance in the low voltage region, 1.6 to 3.0 V, of ε-VOPO$_4$ at C/50, 1C=2Li.

FIG. 9A shows Cycle curves of ε-VOPO$_4$ at high voltage region, from 3.0 to 4.5 V, at different current rates.

FIG. 9B shows rate test capacities of ε-VOPO$_4$ in the low voltage region, from 3.0 to 4.5 V.

DETAILED DESCRIPTION OF THE PREFERRED EMBODIMENTS

Figure 1A:
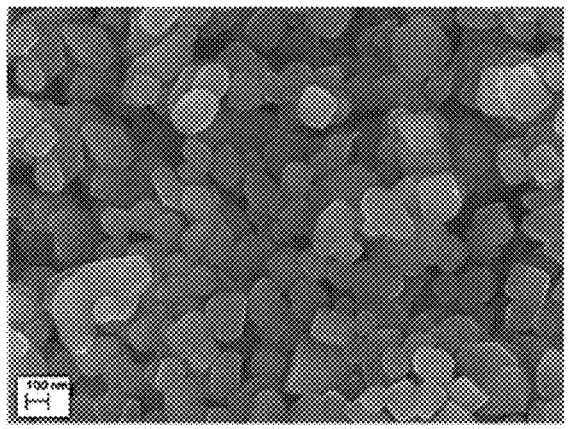
FIG. 1A shows morphological and structure characterization of ε-VOPO$_4$ SEM image.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, are appropriate for use only if consistent with a meaning that is consistent with their meaning in the context of the relevant art and the present disclosure, and will not be interpreted in an idealized or overly formal sense unless expressly so defined herein. Thus, such resources as "Merriam Webster" (any version) are secondary to field of science-appropriate technical dictionaries and encyclopedias.

One or more embodiments will now be described in detail with reference to the following examples. However, these examples are not intended to limit the scope of the one or more embodiments.

The basis of the lithium-ion battery (LIB) uses lithium-ions to travel across the electrolyte and intercalate into the anode upon charge and into the cathode upon discharge [1]. Because they outperform competing primary batteries like lead-acid, alkaline, etc., as well as other rechargeable batteries such as nickel-metal hydride, nickel cadmium, etc., it is no wonder how the LIB has revolutionized and expanded the mobile electronics industry since 1991 [2]. While the performance and functionality of smartphones and laptops continue to improve, the development of LIBs need to catch up to match in terms of power and life cycle to expand into large energy storage applications.

Currently, the cathode material in the market is dominated by LiCoO$_2$. While it has an extremely high theoretical capacity of 274 mAh/g with an operating voltage around 3.6 V, the structure tends to undergo irreversible changes when more than 50% of the Li-ions are removed [3]. Environmental safety and the cost became major concerns as well, thus, drove the search for alternatives where the scarce and toxic cobalt is substituted by other metals such as in LiNi$_{1/3}$Mn$_{1/3}$Co$_{1/3}$O$_2$, also known as NMC [4]. Extensive research for developing alternative cathode materials lead to study of metal phosphates, thus came the LiFePO$_4$. This olivine material has garnered a great deal of attention that it has been commercialized for portable and stationary systems by A123, BAE Systems and in China. In fact, Hydro-Quebec, MIT and A123 further improved this material with high-power performance that can charge and discharge within minutes through nanosizing and carbon coating [5]. Through a collaborative effort from NECCES-I, a fundamental study on this phenomenon determined a metastable reaction mechanism of LiFePO$_4$ which is why it can cycle at high rates [6].

Another way to leverage in the stability of phosphates and to increase energy storage is to incorporate a second electron. Hautier et al. plotted the mean voltage for each per metal redox couple with respect to the capacity in a phosphate, giving way to consider two electron couples. Vanadium phosphate compounds were candidates within the acceptable voltage window [7]. The ε-VOPO$_4$↔ε-LiVOPO$_4$↔ε-Li$_2$VOPO$_4$ system has been regarded as one of the most promising and safe candidates to provide a two-electron reaction with a high theoretical capacity of 305 mAh/g and specific energy over 900 Wh/g [8, 15, 16]. This system has two redox potentials at useful potentials for storing energy, V$^{3+}$↔V$^{4+}$ at 4.0 V and V$^{4+}$↔V$^{5+}$ at 2.5 V. ε-VOPO$_4$ was first synthesized by Lim et al. by heating monoclinic H$_2$VOPO$_4$ in oxygen, and Kerr et al. measured the electrochemical reversibility at the high voltage plateau at 4.0 V [9, 10]. Previously, the synthesis and characterization of ε-VOPO$_4$ from two different phases of H$_2$VOPO$_4$ was reported, to discover that the electrochemical performance from the disordered tetragonal precursor was improved due to smaller particle size [11]. Fundamental studies were conducted on the structural evolution of ε-LiVOPO$_4$ and two intermediate phases in the low-voltage regime identified using DFT calculations backed up with X-ray pair distribution function analysis and X-ray absorption near edge structure measurements [12]. The insertion of two Li-ions into ε-VOPO$_4$ has been demonstrated, reaching the theoretical specific capacity of 305 mAh/g.

EXAMPLE 1

Synthesis: ε-VOPO$_4$ was synthesized by calcining the monoclinic H$_2$VOPO$_4$ precursor, as reported by Song et al. [11] Stoichiometric amounts of VCl$_3$ (Sigma-Aldrich, 97%), and P$_2$O$_5$ (Sigma-Aldrich, ≥98%) were dissolved in 190 proof ethanol (Pharmco-AAPER). The solution was placed in a 4748 Type 125 mL PTFE-lined reactor (Parr Instrument Co.) and the reaction was set to 180° C. for 72 hours. The solvothermal product was collected by centrifugation and heated at 550° C. in flowing oxygen for 3 hours.

Materials Characterization: For XRD measurements, a Bruker D8 Advanced X-ray diffractometer equipped with Cu Kα source, λ=1.54178 Å. The intensities were recorded within the 2θ range from 10° to 80° with 2θ steps of 0.02° from powder samples. The unit cell parameters were obtained by Rietveld refinement with the TOPAS program. Scanning electron microscopy (SEM) measurements were performed with a Zeiss Supra-55 VP field emission scanning electron, using both the secondary electron and InLens modes to determine the morphology and particle size, at an acceleration voltage of 10 kV. Transmission electron microscopy (TEM) imaging was performed using the FEI Titan 80-300 microscope with a field emission gun (FEG) and an image aberration corrector, operated at an acceleration voltage of 300 kV. The pristine material was dispersed on a copper grid coated with a lacey carbon film for high-resolution transmission electron microscopy (HRTEM) observation.

Electrochemistry: The electrodes were prepared by mixing the active material, ε-VOPO$_4$, with graphene nanoplatelets (surface area 750 m$^2$/g, XG Sciences) as a carbon additive and polyvinylidene fluoride (PVDF, Aldrich) binder in a weight ratio of 75:15:10. The slurry was created by adding 1-methyl-2-pyrrolidinone (NMP, Aldrich) which was then laminated onto an aluminum foil 144 current collector and vacuum-dried overnight before use. The dried electrodes, of area 1.2 cm$^2$, contained 8-10 mg of active material and were assembled in 2325-type coin cells in a He-filled glovebox with a pure lithium chip (thickness 0.38 mm, Aldrich) as the counter and reference electrode. The electrolyte used was lithium hexafluorophosphate (1 M LiPF$_6$) dissolved in ethylene carbonate (EC) and dimethyl carbonate (DMC) in 1:1 volume ratio with Celgard 2400 (Hoechst Celanese) as the separator. The electrochemical properties were investigated using the Bio-Logic VMP multichannel potentiostat. The cells were cycled galvanostatically in the high voltage region (3.0-4.5 V), low voltage region (1.6-3.0 V) and the whole voltage (1.6-4.5 V) window at C/50, where 1 C=2 Li or 305 mAh/g per gram of Li$_2$VOPO$_4$. Cells were also cycled at C/20 over the whole voltage range.

Hydrothermal or solvothermal synthesis has many unique advantages because it offers good control over the sample's purity and crystallinity, easy to scale up and low cost. This method can keep the overall particle size small and size distribution narrow which are vital features for good cathodic electrochemical performance. FIG. 1A shows the as-synthesized ε-VOPO$_4$ powder as nano-sized primary particles, ~100-200 nm, that are cuboid in shape. This material matched well with earlier reported results from Chen et al., where ε-VOPO$_4$ synthesized from monoclinic H$_2$VOPO$_4$ are made up of single crystals up to 200 nm [13]. Achieving small primary particles is important because it can improve the rate property for Li intercalation. Azmi et al. reported that smaller LiVOPO$_4$ particle size results in easier lithium-ion diffusion with enhanced columbic efficiency by improving the capacity of lithium deintercalation upon discharge and the decreasing the lithium intercalation potential upon charge [14]. It is also observed in FIG. 1A, that the nano-sized ε-VOPO$_4$ primary particles do not agglomerate nor form into secondary particles, providing a good surface area for the graphene or carbon nanotube additive to wrap around and assist in electron migration during the charge/discharge process.

Figure 1B:
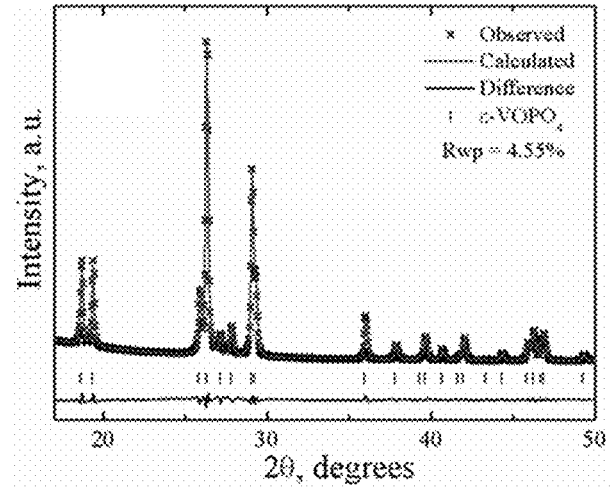
FIG. 1B shows an XRD pattern with Rietveld refinement of the as-synthesized ε-VOPO4.

The lack of primary particle agglomeration is attributed to the choice of solvent used for synthesis. By using 190 proof ethanol, ε-VOPO$_4$ results in loose particle morphology whereas 200 proof ethanol results in the formation of 2 μm balls as secondary particles. By using this solvothermal synthesis route, the precursor was successfully synthesized and calcined to produce pure crystalline ε-VOPO$_4$, as seen in FIG. 1B, resulting in sharp and narrow peaks in the x-ray diffraction pattern. The observed pattern matched very well to the calculated pattern with no impurities or other vanadyl phosphate phases, resulting in a low R$_{wp}$ value of 4.55%.

Figure 2:
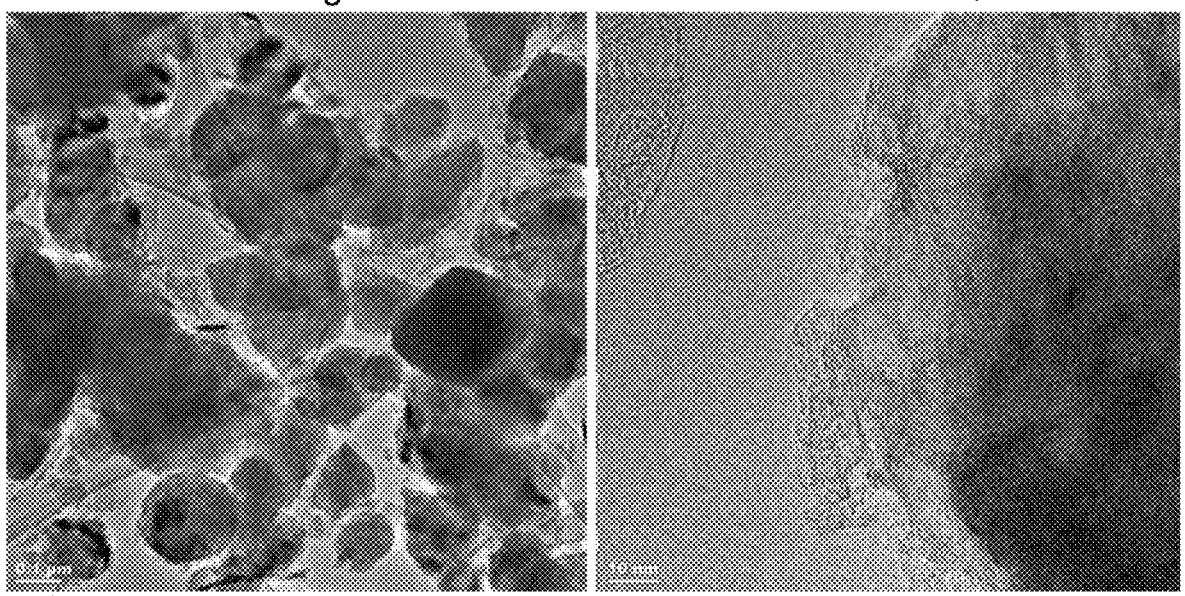
FIG. 2 shows TEM images of ε-VOPO$_4$ hand ground with graphene nanoplatelets for electrode preparation.

Normally, ball-mill treatment is necessary to break up any agglomeration and secondary particles and to reduce the particle size for good electrochemical performance. However, since the as-synthesized ε-VOPO$_4$ is of nanometer size, there is no need to use this application, which helps preserve the crystal structure for better reversible intercalation chemistry. FIG. 2 shows HRTEM images of 75 wt. % ε-VOPO$_4$ that was hand milled with 15 wt. % graphene nanoplatelets in a mortar and pestle before adding 10 wt. % PDVF and NMP for electrode preparation. FIG. 2 shows graphene nanoplatelets forming a conductive network between every single ε-VOPO$_4$ primary particle. Upon closer inspection at FIG. 2B, HRTEM shows that the graphene nanoplatelets coated on the ε-VOPO$_4$ particle is around 10 nm thick.

Figure 3A:
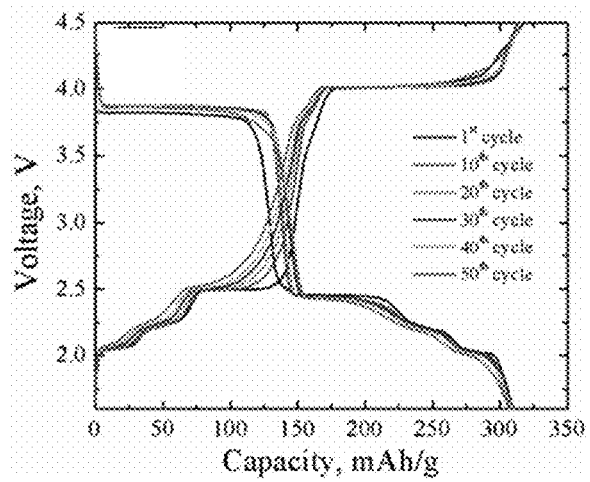
FIG. 3A shows galvanostatic charge-discharge curves of ε-VOPO$_4$ from 1.6 to 4.5 V at C/50.
Figure 3B:
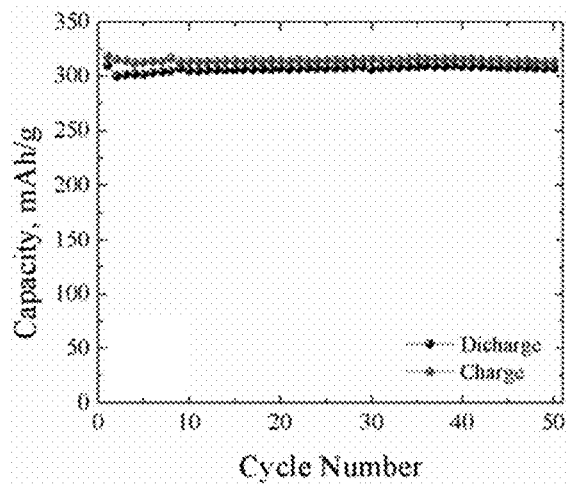
FIG. 3B shows cycle performance of ε-VOPO$_4$ from 1.6 to 4.5 V at C/50, 1C=2 Li.

Electrochemistry of ε-VOPO$_4$:

FIGS. 3A and 3B show ε-VOPO$_4$ cycled in the whole voltage window from 1.6 V to 4.5 V at C/50, capable of achieving a high discharge capacity of 305 mAh/g for at least 50 cycles. FIG. 2A displays the desired characteristic plateaus at ~4.0 V at the high voltage region and at ~2.5, 2.25, 2.0 V at the low voltage region. The drop from the high voltage region to the low voltage region is a step-like curve and the hysteresis gap between the charge and discharge curve is very small. The high voltage region has a long plateau which extends the capacity to ~150 mAh/g, equivalent to ~1 Li. This corresponds to the redox potential of V$^{3+}$ and V$^{4+}$ where ε-VOPO$_4$ becomes ε-LiVOPO$_4$. The low voltage region has three plateaus at 2.5, 2.25 and 2.0 V which also extends the capacity to ~150 mAh/g, corresponding to the second intercalation of lithium where ε-LiVOPO$_4$ becomes ε-Li$_2$VOPO$_4$. The plateaus at the low voltage region has maintained step-like curves even after 35 cycles, suggesting good kinetics and the changes in the local structure may be reversible for easy Li intercalation.

Figure 4:
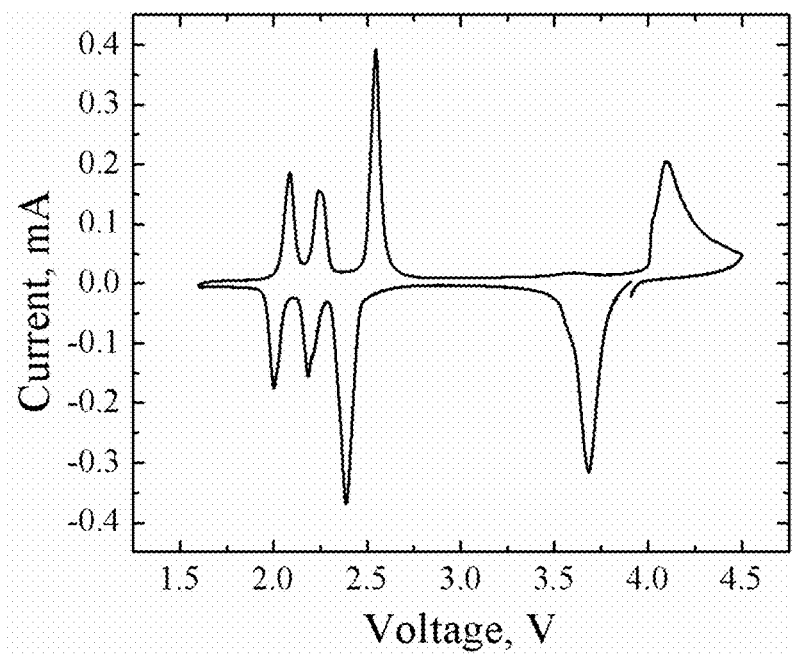
FIG. 4 shows a CV curve profile of ε-VOPO$_4$ at a scan rate of 0.02 mV/s.

Cyclic voltammetry (CV) curves was measured in the voltage window of 1.6 V to 4.5 V to understand the redox process of ε-VOPO$_4$ is shown in FIG. 4. There are four reduction peaks at certain voltages that correspond to four oxidation peaks at similar voltages. Each peak represents the reversible reaction between ε-VOPO$_4$ and ε-Li$_2$VOPO$_4$ that correspond to the voltage plateaus found upon galvanostatic charge and discharge cycling. Starting from the OCV point at 3.9 V, there is a single oxidation peak at 3.7 V that indicates electrochemical lithiation from ε-VOPO$_4$ to ε-LiVOPO$_4$. As the scan rate test moves to the low voltage region, there are three additional oxidation peaks. Each of the peaks signify the transition from ε-LiVOPO$_4$ to ε-Li$_2$VOPO$_4$ with intermediate stages in between. ε-LiVOPO$_4$ becomes ε-Li$_{1.5}$VOPO$_4$ at ~2.5 V, then it converts to ε-Li$_{1.75}$VOPO$_4$ at ~2.25 V and finally becomes ε-Li$_2$VOPO$_4$ at ~2.0 V. Reduction peaks appear as the voltage continues to sweep from the low to high voltage domain, indicating that the V$^{5+}$ oxidation state of ε-VOPO$_4$ was recovered from V$^{3+}$ of ε-Li$_2$VOPO$_4$. From ε-Li$_2$VOPO$_4$, it becomes ε-Li$_{1.75}$VOPO$_4$ at ~2.1 V, then ε-Li$_{1.5}$VOPO$_4$ at ~2.25 V and ε-LiVOPO$_4$ at ~2.5 V. No further reaction takes place until ~4.25 V where ε-LiVOPO$_4$ further reduces to become ε-VOPO$_4$.

FIGS. 5A and 5B show that even at a faster rate, ε-VOPO$_4$ can still deliver a discharge capacity of ~305 mAh/g for up to 40 cycles at C/20. The long high voltage plateau extending past 100 mAh/g is preserved and each of the characteristic steps in the low voltage region are clearly sustained with no signs of diminishing for up to 30 cycles. In FIG. 4A, the drop from the high voltage region to the low voltage region evolved to a slope-like curve, which helps make up for the shorter high voltage plateau in the beginning but might indicate a little hysteresis. In subsequent cycles, the high voltage plateau slightly increases. The capacity of the 1$^{st}$ high voltage discharge plateau was ~125 mAh/g and by the 35$^{th}$ cycle, it increased to ~150 mAh/g which is equivalent to 1 Li. The low voltage region seems to show the opposite trend. As the high voltage plateau starts to increase in capacity, the low voltage steps start to decrease as well to maintain the overall discharge capacity at ~305 mAh/g.

Cycling of ε-VOPO$_4$ has been separated at the high voltage region and the low voltage region to study the stability of the electrochemical curve and capacity without the influence of each other. FIGS. 6A and 6B show ε-VOPO$_4$ cycled in the low voltage region to study how long-term cycling affects the shape and length of these three distinct plateaus at 2.5 V, 2.25 V and 2.0 V which is in agreement with DFT calculations confirming the two intermediate phases at x=1.5 and 1.75 in the low-voltage regime [12]. The initial discharge curve in FIG. 6A is different because the cell was discharged from OCV first, delivering more than 300 mAh/g. Even after 30 cycles, FIG. 6A shows that each voltage step is clearly distinguished, delivering a reversible capacity of ~160 mAh/g, correlating to 1 Li. From then on, the cell was continuously charged and discharged in the low voltage window, from 1.6 V to 3.0 V. FIG. 6B shows that the low voltage steps maintained ~160 mAh/g for up to 30 cycles with no sign of decay at all, suggesting good kinetics at the low voltage region. The charge-discharge profiles with steps agree with many reports, giving evidence to the existence of intermediate phases of ε-Li$_x$VOPO$_4$ where x=1.5 and 1.75.

Figure 7A:
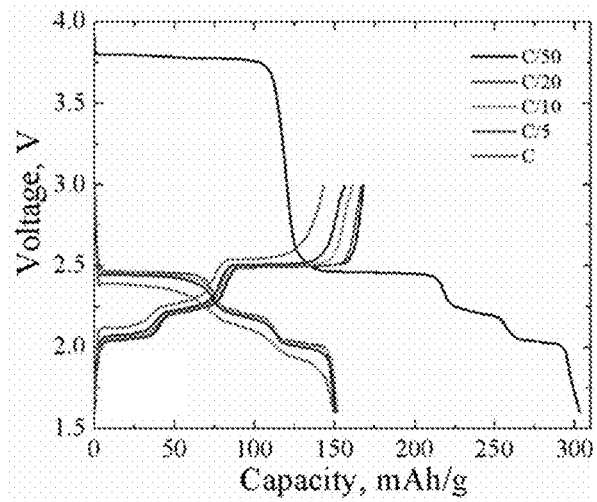
FIG. 7A shows cycling curves of ε-VOPO$_4$ in the low voltage region, from 1.6-3.0 V, at different rates.
Figure 7B:
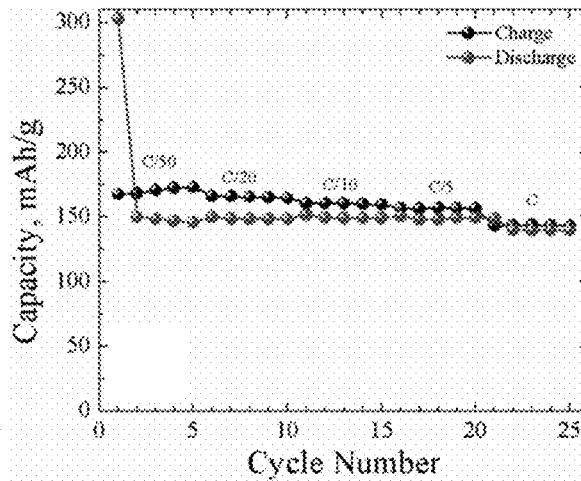
FIG. 7B shows rate test capacities of ε-VOPO$_4$ in the low voltage region, from 1.6 to 3.0 V.

A rate test in the low voltage region was performed to study how faster cycling can affect the plateaus at 2.5 V, 2.25 V and 2.0 V, as shown in FIGS. 7A and 7B. To start the rate test at the low voltage region, the cell was first discharged from OCV to 1.6 V at C/50, delivering a discharge capacity of over 300 mAh/g. From C/50 to C/5, the low voltage plateaus still maintained a discharge capacity of ~150 mAh/g with clearly defined step-like features, as shown in FIG. 7A. When the rate increased to 1C, the discharge capacity is still ~150 mAh/g but the plateaus are more slope-in shape at slightly lower voltages. As the cycling rate increases, the difference between the charge and discharge capacities decreases, as shown in FIG. 7B. From C/50, the charge capacity is 175 mAh/g while the discharge is ~150 mAh/g. When the rate increased to 1C, the charge and discharge capacities are ~150 mAh/g, thereby increasing the coulombic efficiency to ~100%. When cycled at the low voltage range, ε-VOPO$_4$ can reversibly intercalate one full lithium ion at the low voltage region, even at faster cycling rates.

Figure 8A:
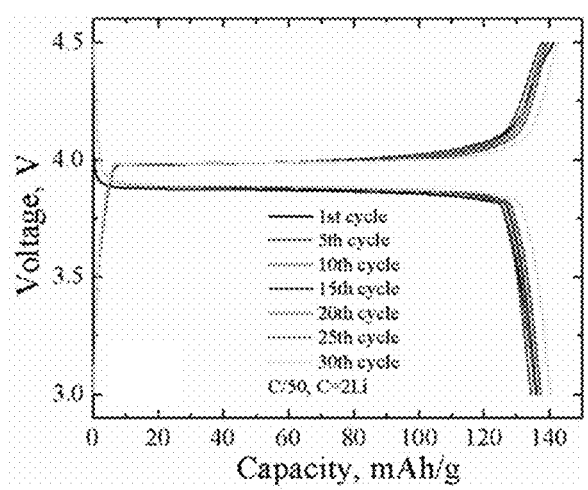
FIG. 8A shows galvanostatic charge-discharge curves of ε-VOPO$_4$ at the high voltage region, from 3.0 to 4.5 V.
Figure 8B:
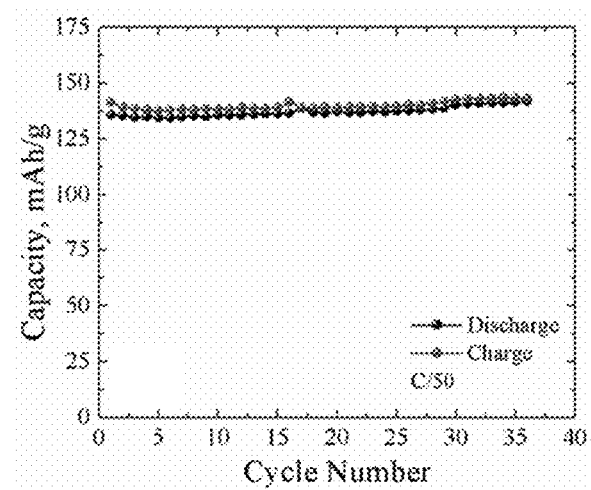
FIG. 8B shows cycle performance in the high voltage region, 3.0-4.5 V, of ε-VOPO$_4$ at C/50, 1C=2Li.
Figure 10:
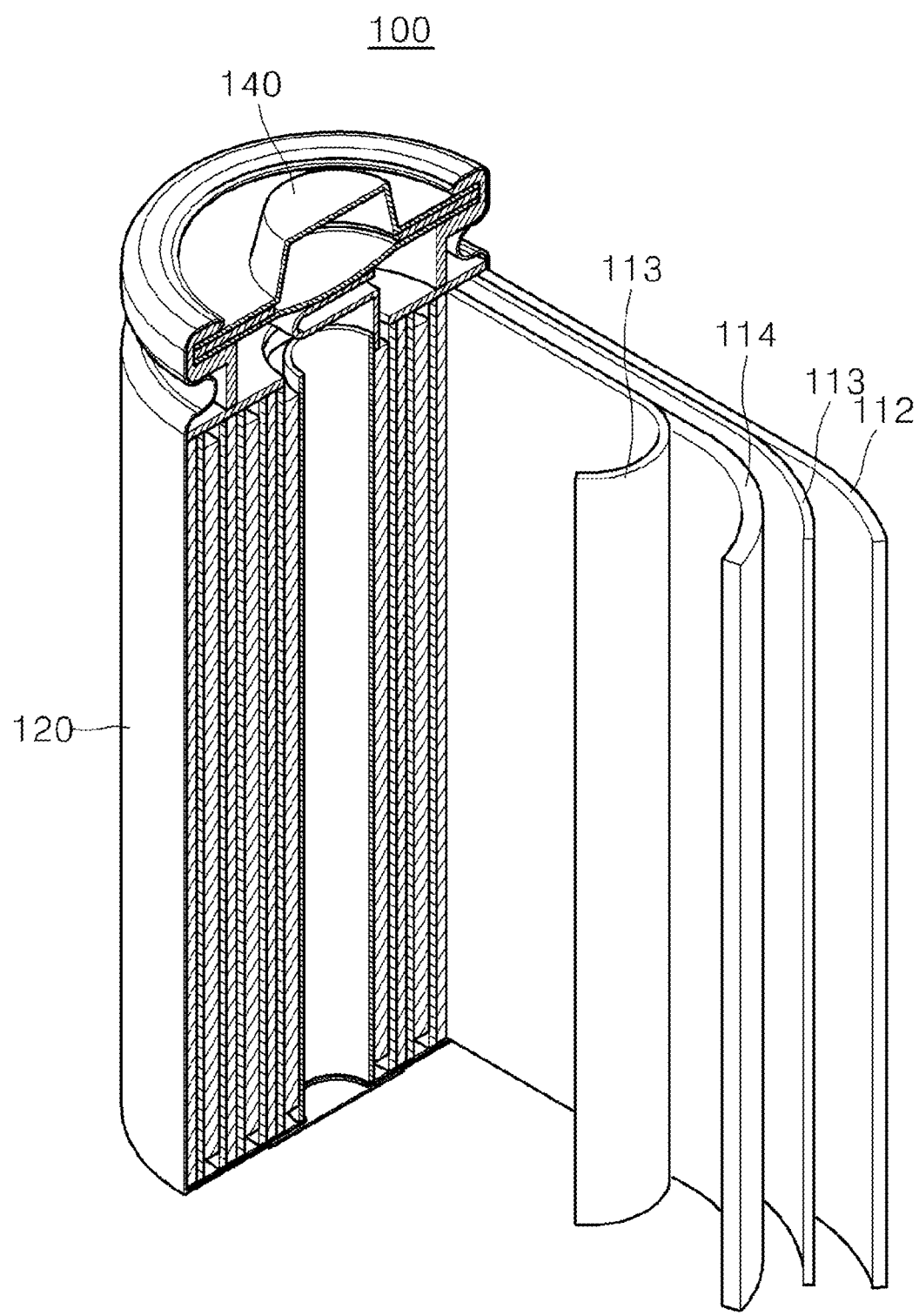
FIG. 10 is an exploded perspective view of a lithium secondary battery according to an embodiment.

FIGS. 8A and 8B show ε-VOPO$_4$ cycled in the high voltage region, from 3.0 V to 4.5 V, to study how long-term cycling affects the shape and capacity. In this high voltage window, there is a plateau at ~4.0 V that coincides with the V$^{3+/4+}$ redox where ε-VOPO$_4$↔LiVOPO$_4$. This high voltage plateau delivers a reversible capacity of ~140 mAh/g for up to 35 cycles which is close to 0.93 Li. This exceeds the previously reported results, where only 0.83 Li was inserted into ε-VOPO$_4$ and 0.65 Li was inserted into ε-LiVOPO$_4$. [11,12] After 30 cycles, the capacity slowly climbs to 150 mAh/g which corresponds to 1 Li which agrees with the trend in the galvanostatic charge-discharge curves in FIG. 4. Even after 30 cycles, FIG. 8B shows that ε-VPOPO$_4$ delivers a reversible capacity of ~150 mAh/g, correlating to 1 Li. This plateau is step-like with no signs of fading after many cycles, suggesting easy reversible intercalation.

FIGS. 9A and 9B show how different rates can affect the high voltage plateau of ε-VOPO$_4$ at ~4.0 V. At C/50, the discharge capacity is around 130 mAh/g and the capacity decreases as the rate gets faster. By 1 C, the discharge capacity dropped to around 40 mAh/g. Despite the fast rate cycling of 1 C, the cell could deliver the high discharge capacity of 140 mAh/g after it was cycled back to C/50. This suggests that the structure was preserved, even at fast cycling, and can maintain a high discharge capacity when it was cycled back to C/50 from 1 C. It also seems that faster cycling leads to higher coulombic efficiency. It is evident that from C/50 to C, the coulombic efficiency increases. From C/25, some of the charge and discharge capacities are overlapping and by C/10, C/5 and C, the discharge capacities are practically the same as the charge. This means that at faster rates, it can de/intercalate lithium ion more efficiently.

Conclusions

The optimized morphology and nano particle size of ε-VOPO$_4$ is studied, as well as observations from transmission electron microscope to analyze the good carbon conductive network. By combining complementary characterization techniques of SEM, XRD and extensive electrochemical studies, the reversibility reaction of ε-VOPO$_4$ as a cathode material for lithium-ion batteries is elucidated.

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

REFERENCES

1. M. S. Whittingham, Chem. Rev. 2014, 104, 4271-4301.
2. M. Winter, R. J. Brodd, Chem. Reviews, 2004, 104, 4245-4270.
3. B. C. Melot, J. M. Tarascon, Acc. Chem. Res., 2013, 46, 1226-1238.
4. M. S. Whittingham, Chem. Rev. 2014, 114, 11414-11443.
5. K. Zaghib, A. Mauger, F. Gendron, C. M. Julien, Chem. Mater., 2008, 20, 462-469.
6. H. Liu, F. C. Strobridge, O. J. Borkiewicz, K. M. Wiaderek, K. W. Chapman, P. J. Chupas, C. P. Grey, Science, 2014, 344, 1252817.
7. G. Hautier, A. Jain, S. P. Ong, B. Kang, C. Moore, R. Doe, G. Ceder, Chem. Mater. 2011, 23, 3495-3508.
8. B. Wen, Q. Wang, Y. C. Lin, N. A. Chernova, K. Kharki, Y. Chung, F. Omenya, S. Sallis, L. F. J. Piper, S. P. Ong, M. S. Whittingham, Chem. Mater, 2016, 9, 3159-3170.
9. S. C. Lim, J. T. Vaughey, W. T. A. Harrison, L. L. Dussack, A. J. Jacobson, J. W. Johnson, Solid State Ionics 1996, 84, 219-226.
10. T. A. Kerr, Solid-State Lett. 1999, 3, 460.
11. Song, Y.; Zavalij, P. Y; Whittingham, M. S J. Electrochem. Soc. 2005, 152, A721.
12. Y. C. Lin, B. Wen, K. M. Wiaderek, S. Sallis, H. Liu, S. H. Lapidus, O. J. Borkiewicz, N. F. Quackenbush, N. A. Chernova, K. Karki, F. Omenya, P. J. Chupas, L. F. J. Piper, M. S. Whittingham, K. W. Chapman, and S. P. Ong, Chem. Mater., 2016, 28, 1794-1805.
13. Z. Chen, Q. Chen, L. Chen, R. Zhang, H. Zhou, N. A. Chernova, M. S. Whittingham, J. Electrochem. Soc. 2013, 160, A1777-A1780.
14. B. M. Azmi, H. S. Munirah, T. Ishihara, Ionics, 2005, 11.
15. M. Bianchini, J. M. Ateba-Mba, P. Dagault, E. Bogdan, D. Carlier, E. Suard, C. Masquelier, L. Croguennec, J. Mater. Chem. A, 2014, 2, 10182-10192.
16. K. L. Harrison, C. A. Bridges, C U. Segre, C. D. Varnado Jr., D. Applestone, C. W. Bielawski, M. P. Paranthaman, A. Manthiram, Chem. Mater., 2014, 26, 3849-3861.

The invention claimed is:

1. A method of making a lithium ion battery cathode, comprising:
    forming ε-VOPO$_4$ particles having a diameter of 100-200 nm;
    coating the ε-VOPO$_4$ particles with conductive carbon, to form coated ε-VOPO$_4$ particles;
    adding a binder to the coated ε-VOPO$_4$, particles to form a mixture;
    depositing the mixture on a current collector,
    wherein the deposited mixture has a capacity of at least 275 mAh per gram of Li$_2$VOPO$_4$ at a discharge rate of C/20.

2. The method according to claim 1, wherein the ε-VOPO$_4$ particles are solvothermally generated.

3. The method according to claim 1, wherein the ε-VOPO$_4$ particles are hydrothermally generated.

4. The method according to claim 1, wherein said coating comprises mixing the ε-VOPO$_4$ particles with graphene nanoplatelets.

5. The method according to claim 4, wherein the graphene nanoplatelets have a surface area of at least 100 m$^2$/g.

6. The method according to claim 1, wherein the binder comprises polyvinylidene fluoride.

7. The method according to claim 1, wherein the ε-VOPO$_4$ particles are coated with carbon nanotubes.

8. The method according to claim 1, wherein the coated ε-VOPO$_4$ particles have a coating thickness of 10 nm.

9. The method according to claim 1, wherein the ε-VOPO$_4$ particles of the lithium ion battery cathode comprises a vanadium which is adapted to undergo a change in oxidation state of two between a charged state filled with intercalated lithium ions and a discharged state depleted of intercalated lithium ions.

10. The method according to claim 9, wherein the lithium ion battery cathode has a current-voltage profile which displays voltage plateaus on discharge at a discharge rate of C/20, at about 2.1 V, 2.25 V, 2.5 V, and 3.9 V.

11. The method according to claim 10, wherein the ε-VOPO$_4$ particles have a capacity of at least 305 mAh per gram of Li$_2$VOPO$_4$ at a discharge rate of C/20.

12. The method according to claim 10, wherein the lithium ion battery cathode has a discharge capacity of at least 90% of a theoretical value for the discharge capacity of the ε-VOPO$_4$ particles.

13. The method according to claim 9, wherein the ε-VOPO$_4$ particles have a capacity of at least 290 mAh per gram of Li$_2$VOPO$_4$ at a discharge rate of C/20.

14. The method according to claim 1, wherein the ε-VOPO$_4$ particles have an energy capacity of at least 850 mWh/g.

15. The method according to claim 1, wherein the conductive carbon comprises graphene particles, and the mixture comprises between 5% and 15% by weight of the graphene particles.

16. The method according to claim 1, wherein the mixture comprises at least 75% by weight ε-VOPO$_4$ particles, at least 5% by weight graphene nanoplatelets, and at least 5% by weight of a binder.

17. The method according to claim 1, wherein the lithium ion battery cathode has at least two states, comprising:
    a first state in which at least 80 mol % of vanadium of the ε-VOPO$_4$ particles is oxidized in a first oxidation state and associated with two lithium ions per vanadium, and
    a second state in which at least 80 mol % of the ε-VOPO$_4$ particles is oxidized in a second oxidation state which differs by two from the first oxidation state.

18. The method according to claim 1, further comprising forming a lithium ion battery comprising:
    the lithium ion battery cathode;
    a lithium or lithium ion anode;
    an electrolyte adapted to operate at a battery potential of at least 4.5 V; and
    a supporting lithium salt.

19. A method of making a lithium ion battery cathode, comprising:
- combining ε-VOPO$_4$, particles having a diameter of 100-200 nm coated with electrically conductive carbon particles, and a binder to form a mixture; and
- coating a current collector with a slurry of the mixture,
- wherein the ε-VOPO$_4$ has a dual lithium ion exchange characteristic, having a capacity of about 125 mAh per gram of Li$_2$VOPO$_4$ at a discharge rate of C/20 while maintaining a voltage exceeding 3.7 V and a capacity of at least 275 mAh per gram of Li$_2$VOPO$_4$ at a discharge rate of C/20 while maintaining a voltage exceeding 1.6 V.

20. A lithium ion battery cathode, comprising a mixture of ε-VOPO$_4$ particles having a size of 100-200 nm, coated with electrically conductive graphene, and a binder, on a current collector, having a capacity of at least 275 mAh per gram of Li$_2$VOPO$_4$ at a discharge rate of C/20.

* * * * *